United States Patent
Miyajima et al.

(10) Patent No.: US 10,513,259 B2
(45) Date of Patent: Dec. 24, 2019

(54) VEHICLE CONTROL DEVICE

(71) Applicant: MITSUBISHI JIDOSHA KOGYO KABUSHIKI KAISHA, Tokyo (JP)

(72) Inventors: Shohei Miyajima, Tokyo (JP); Toshiyuki Miyata, Tokyo (JP); Hitoshi Toda, Tokyo (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/928,443

(22) Filed: Mar. 22, 2018

(65) Prior Publication Data

US 2018/0273025 A1    Sep. 27, 2018

(30) Foreign Application Priority Data

Mar. 23, 2017  (JP) .................... 2017-057169

(51) Int. Cl.
*B60W 10/06* (2006.01)
*F02D 9/02* (2006.01)
(Continued)

(52) U.S. Cl.
CPC .......... *B60W 30/025* (2013.01); *B60W 10/06* (2013.01); *B60W 10/101* (2013.01); (Continued)

(58) Field of Classification Search
CPC .............. B60W 10/06; F02D 2009/022; F02D 41/0007; F02B 37/183
See application file for complete search history.

(56) References Cited

U.S. PATENT DOCUMENTS 6,692,406 B2 * 2/2004 Beaty ............... B60W 10/06
477/109
10,082,124 B2 * 9/2018 Hiwatashi .......... B60W 30/045
(Continued)

FOREIGN PATENT DOCUMENTS

EP    2 857 660 A1    4/2015
EP    2 899 085 A1    7/2015
(Continued)

OTHER PUBLICATIONS

Extended European Search Report dated Aug. 8, 2018 in corresponding European Application No. 18163173.0.

*Primary Examiner* — Tisha D Lewis
(74) *Attorney, Agent, or Firm* — Birch, Stewart, Kolasch & Birch, LLP

(57) ABSTRACT

A control device for a vehicle includes a driver request torque detection unit that detects a driver request torque, a restriction torque calculation unit that calculates a restriction torque being smaller than the driver request torque based on an external request, a corrected torque calculation unit that calculates a corrected torque being greater than the restriction torque, and an engine control unit that controls positions of a throttle valve and an exhaust bypass valve. The engine control unit controls the positions of the throttle valve and the exhaust bypass valve based on the driver request torque during an ordinary drive, and if a prescribed drive condition is satisfied, the engine control unit controls the position of the throttle valve based on the restriction torque and controls the position of the exhaust bypass valve based on the corrected torque.

9 Claims, 6 Drawing Sheets

(51) Int. Cl.
*F02D 41/00* (2006.01)
*F02B 37/18* (2006.01)
*B60W 30/02* (2012.01)
*F02D 41/02* (2006.01)
*F02D 41/10* (2006.01)
*B60W 10/101* (2012.01)
*F02P 5/15* (2006.01)

(52) U.S. Cl.
CPC .............. *F02B 37/183* (2013.01); *F02D 9/02* (2013.01); *F02D 41/0007* (2013.01); *F02D 41/023* (2013.01); *F02D 41/10* (2013.01); *F02P 5/15* (2013.01); *B60W 2540/10* (2013.01); *F02D 2009/022* (2013.01); *F02D 2250/21* (2013.01); *F02D 2250/26* (2013.01); *Y02T 10/144* (2013.01)

(56) References Cited

U.S. PATENT DOCUMENTS

2011/0041493 A1* 2/2011 Doering .............. F02D 41/0007
60/603
2015/0120115 A1 4/2015 Chinbe et al.

FOREIGN PATENT DOCUMENTS

JP 2013-204781 A 10/2013
WO WO 2015/087159 A1 6/2015

\* cited by examiner

VEHICLE CONTROL DEVICE

BACKGROUND OF THE INVENTION

1. Field of the Invention

The present invention relates to a control device for a vehicle in which an engine is installed, the engine being provided with a turbocharger for supercharging intake air by collecting exhaust gas energy by a turbine and a waste gate valve for adjusting an exhaust gas to be supplied to the turbine.

2. Description of the Related Art

Engines that are provided with a turbocharger for supercharging intake air to be introduced into a combustion chamber utilizing exhaust gas energy are now employed broadly.

In turbochargers of this type, a compressor is disposed at a halfway position in an intake passage of an engine and a turbine is disposed at a halfway position in an exhaust passage. The compressor is operated by rotating the turbine by an exhaust gas flowing through the exhaust passage, whereby the rate of supply of intake air to a combustion chamber is raised to increase the engine torque.

Turbochargers of this type employ an exhaust bypass valve for adjusting the rate of inflow of exhaust gas to the turbine by supplying part of an exhaust gas to an exhaust bypass passage (what is called a waste gate valve). The supercharging pressure of intake air can be controlled by adjusting the rate at which an exhaust gas passing through the turbine by means of the waste gate valve.

Whereas related waste gate valves are controlled by a pneumatic actuator that uses a supercharging pressure as a drive source, in recent years electrically controlled waste gate valves that are open/close-controlled by a motor have come to be employed. The employment of an electrically controlled waste gate valve enables driving even when the supercharging pressure is low as well as a finer control.

Recent vehicles in many cases employ a continuously variable transmission (CVT) or the like capable of varying the transmission gear ratio steplessly, that is, continuously. Such stepless transmission mechanisms have a stepless automatic transmission mode in which the transmission gear ratio is varied steplessly according to a drive state when a shift lever to be manipulated by a driver is at an automatic shift position.

In vehicles that are equipped with a stepless transmission mechanism such as a continuously variable transmission, an acceleration control is performed so as to include a drive range where the engine rotation speed does not increase so as to be coupled with a speed increase whereas ordinarily the engine rotation speed increases with a speed increase. For example, in a high-speed range beyond a certain speed, there exists a drive range where the engine rotation speed does not increase but is kept constant even if the vehicle speed increases.

In such a drive range (hereinafter referred to as a "decoupled drive range") where a setting is made that the engine rotation speed does not increase so as to conform to a speed increase, the driver cannot feel actual vehicle speed increase in the form of increase of the engine rotation speed, possibly resulting in a certain kind of uncomfortableness of driving.

A technique for lessening such uncomfortableness of driving, what is called a step-up shift technique, is known in which during acceleration the engine rotation speed is lowered discontinuously by decreasing the transmission gear ratio deliberately and the transmission gear ratio is decreased again when the engine rotation speed has increased thereafter. This step-up shift control allows the driver to experience a drive feeling similar to one as obtained by a stepwise shift-up manipulation (i.e., as obtained in vehicles that are equipped with an automatic transmission or a manual transmission). This makes it possible to lessen uncomfortableness of driving that the driver would otherwise feel (For example, see JP-A-2013-204781).

In the above-described step-up shift technique, to prevent an event that an excessive torque causes the driver to experience a drive feeling that the vehicle were being pushed forward when the transmission gear ratio is decreased, a target torque setting value is decreased and the throttle valve and the waste gate valve are controlled so as to realize a relatively small target air charging efficiency value that is calculated from the reduced target torque setting value. More specifically, a control for lowering the supercharging pressure is performed by opening the waste gate valve to realize the relatively small target air charging efficiency value.

However, this control is associated with the following problem. Once the intake air pressure is lowered to realize the relatively small target air charging efficiency value, even if the waste gate valve is closed to raise the intake air pressure upon completion of the step-up shift control, the intake air pressure does not rise immediately to cause delay in attaining supercharging for a new target air charging efficiency value and hence delay of a rise of actual torque. Such supercharging delay tends to also occur after controls other than the step-up shift control, such as a control that is performed in response to a temporary torque restriction request that is based on any of various external requests such as one for a vehicle side slip preventive control.

SUMMARY OF THE INVENTION

An object of the invention is therefore to suppress supercharging delay that occurs after torque is reduced in response to a temporary toque reduction request.

To attain the above object, the invention provides for a vehicle provided with an internal combustion engine that has an intake passage and an exhaust passage which are connected to a combustion chamber, a throttle valve disposed in the intake passage, a turbocharger having an exhaust gas turbine which is disposed in the exhaust passage and driven by an exhaust gas flowing through the exhaust passage and a compressor which is disposed in the intake passage and supercharges intake air to be supplied to the combustion chamber, and an exhaust bypass valve for opening or closing an exhaust bypass passage that connects portions, upstream of and downstream of the exhaust gas turbine, of the exhaust passage, the control device comprising:

a driver request torque detection unit that detects a driver request torque which is an engine output torque requested by a driver;

a restriction torque calculation unit that calculates a restriction torque which is smaller than the driver request torque based on an external request;

a corrected torque calculation unit that calculates a corrected torque which is greater than the restriction torque; and an engine control unit that controls a position of the throttle valve and a position of the exhaust bypass valve, wherein the engine control unit controls the position of the throttle valve and the position of the exhaust bypass valve based on the driver request torque during an ordinary drive of the vehicle, and if a prescribed drive condition is satisfied, the engine control unit controls the position of the throttle valve based on the restriction torque and controls the position of the exhaust bypass valve based on the corrected torque.

For example, the corrected torque may be the same as the driver request torque.

For example, the vehicle has a stepless transmission mechanism for varying the transmission gear ratio steplessly, and the control device may be such that it further comprises a transmission control unit that controls the stepless transmission mechanism, and that the prescribed drive condition relates to a step-up shift control of decreasing the transmission gear ratio of the stepless transmission mechanism and thereby lowering the engine rotation speed during acceleration.

In each of the above control devices, in controlling the position of the exhaust bypass valve based on the corrected torque, the engine control unit performs a control for lowering a fuel combustion performance in the combustion chamber.

Where the internal combustion engine has an ignition device for burning fuel in the combustion chamber, for example, the engine control unit delays an ignition timing of the ignition device when performing a control for lowering the fuel combustion performance in the combustion chamber.

For example, the engine control unit may control the position of the throttle value in a closing direction in controlling the position of the exhaust bypass valve based on the corrected torque.

According to the invention, the positions of the throttle valve and the exhaust bypass valve are controlled based on a driver request torque during an ordinary drive, and, if a prescribed drive condition is satisfied, the position of the throttle valve is controlled based on a restriction torque that is smaller than the driver request torque and the position of the exhaust bypass valve is controlled based on a corrected torque that is greater than the driver request torque. Thus, supercharging delay can be suppressed that occurs after torque is reduced in response to a temporary toque reduction request.

DETAILED DESCRIPTION OF THE EXEMPLARY EMBODIMENTS

Figure 1:
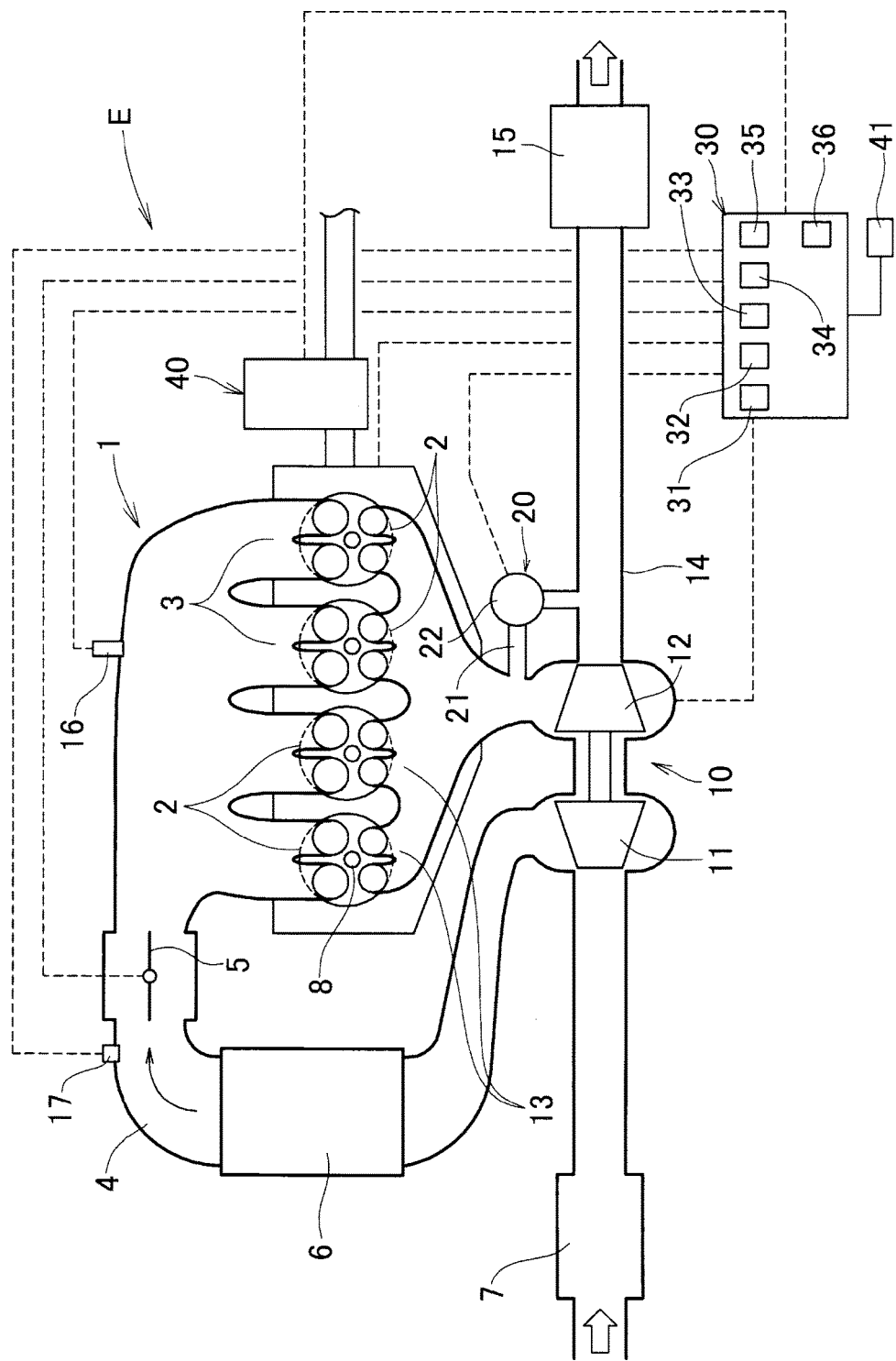
FIG. 1 is a schematic diagram showing an essential part of a vehicle control device according to an embodiment.
Figure 2:
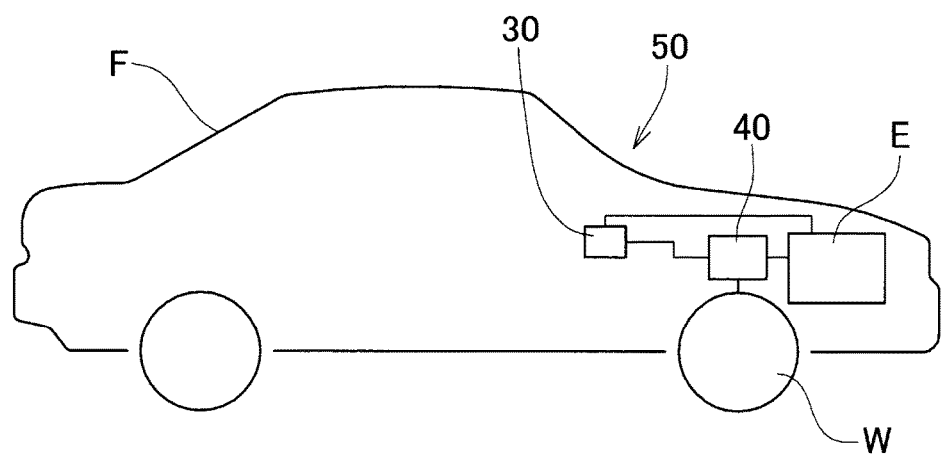
FIG. 2 is a schematic diagram showing a vehicle which is equipped with the vehicle control device according to the embodiment.

An embodiment of the present invention will be hereinafter described with reference to the drawings. FIG. 1 is a schematic diagram showing conceptually an essential part of a control device 50 according to the embodiment of a vehicle F in which an internal combustion engine (hereinafter referred to as an engine E) is installed. FIG. 2 is a schematic diagram showing the vehicle F which is equipped with the vehicle control device 50.

The engine E employed in the embodiment is a 4-cycle engine. As shown in FIG. 1, the engine E includes intake ports 3 for sending intake air to respective combustion chambers 2, an intake passage 4 which leads to the intake ports 3, exhaust ports 13 for sending out exhaust gasses from the respective combustion chambers 2, an exhaust passage 14 which is connected to the exhaust ports 13, fuel injection devices for injecting fuel into the intake ports 3 or the combustion chambers 2, and other things. The intake ports 3 and the exhaust ports 13 are opened or closed by respective valves.

Although the embodiment assumes the use of the 4-cylinder engine, the present concept is applicable irrespective of the number of cylinders.

The intake passage 4 which leads to the combustion chambers 2 is provided with, upstream from the intake ports 3 which connect the intake passage 4 to the combustion chambers 2, a pressure sensor 16 for acquiring intake air rate information by detecting a pressure in an intake manifold, a throttle valve 5 for adjusting the cross section of a flow passage to the intake ports 3, an air flow sensor 17 for detecting a passing air rate, an intake air cooling device (intercooler) 6 for cooling intake air flowing through the intake passage 4, a compressor 11 of a turbocharger 10, and an air cleaner 7, etc.

The exhaust passage 14 is provided with, downstream from the exhaust ports 13 which connect the exhaust passage 14 to the combustion chambers 2, a turbine 12 of the turbocharger 10, an exhaust gas cleaning unit 15 having, among other things, a catalyst for removing harmful substances from an exhaust gas, a silencer, etc.

The turbocharger 10 has the compressor 11 which is disposed in the intake passage 4 and serves to supercharge intake air to be introduced into the combustion chambers 2 and the exhaust gas turbine 12 which is disposed in the exhaust passage 14. When the exhaust gas turbine 12 is rotated by an exhaust gas flowing through the exhaust passage 14, its rotational power is transmitted to the compressor 11 which is disposed in the intake passage 4. Intake air flowing through the intake passage 4 is supercharged by the rotation of the compressor 11.

An exhaust bypass device 20, which is what is called a waste gate valve device, is provided. The exhaust bypass device 20 has an exhaust bypass passage 21 which connects the upstream side and the downstream side of the exhaust gas turbine 12 and an exhaust bypass valve 22 for opening or closing the exhaust bypass passage 21. If the exhaust bypass valve 22 is opened, part of an exhaust gas flowing toward the exhaust gas turbine 12 flows into the exhaust bypass passage 21 through exhaust bypass valve 22, whereby the exhaust gas energy exerted on the exhaust gas turbine 12 is reduced and hence the supercharging pressure of intake air is lowered.

In the embodiment, the exhaust bypass valve 22 is an electrically controlled waste gate valve that is open/close-controlled by a motor.

The engine E is installed in the vehicle F. The vehicle F has an electronic control unit 30 for controlling the engine E. The electronic control unit 30 is a control device for generally controlling the vehicle F, and has an input and output device connected to a variety of sensors, a storage device (for example, a ROM, a RAM, a non-volatility RAM and so on), a Central Processing Unit (CPU), and a timer etc. The electronic control unit 30 acquires information from the pressure sensor 16, the air flow sensor 17, an exhaust gas temperature sensor for detecting an exhaust gas temperature, a water temperature sensor for detecting a temperature of cooling water for cooling a cylinder block etc., a rotation speed sensor for detecting a rotation speed of the crankshaft of the engine E, a vehicle speed sensor for detecting a speed of the vehicle F, and other sensor devices for acquiring information that is necessary for control of the engine E, and uses the acquired information for control of the engine E.

The vehicle F is equipped with a driver request input device 41 for inputting a driver request torque A that is an engine output torque requested by a driver. The driver request input device 41 is an accelerator device (accelerator pedal) to be manipulated by the driver. A torque-related driver request is adjusted according to a degree of stepping on the accelerator device.

The electronic control unit 30 is equipped with an engine control unit 31 for issuing instructions that are necessary for engine control such as control of fuel injection by the fuel injection devices, supercharging pressure control, and control of the position of the throttle valve 5. The engine control unit 31 controls the throttle valve 5, the turbocharger 10, the exhaust bypass valve 22, and other devices on the basis of target air charging efficiency that is determined according to a requested torque.

The electronic control unit 30 has a driver request torque detection unit 34 for detecting a driver request torque A. The driver request torque detection unit 34 calculates an engine output torque requested by the driver by acquiring information indicating a degree of stepping on the accelerator pedal using an accelerator position sensor or the like.

The electronic control unit 30 also has a restriction torque calculation unit 35 for calculating a restriction torque B that is smaller than a driver request torque A. The restriction torque calculation unit 35 calculates a restriction torque B that is different from a driver request torque A, for a temporary torque reduction request (hereinafter referred to as an external request) that is not a request from the driver (hereinafter referred to as a "driver request").

Furthermore, the electronic control unit 30 has a corrected torque calculation unit 36 for calculating a corrected torque C that is greater than its restriction torque B upon reception of an external request. It suffices that the corrected torque C be greater than the restriction torque B, and the corrected torque C may have the same value as a driver request torque A.

The engine control unit 31 controls the positions of the throttle valve 5 and the exhaust bypass valve 22. The engine control unit 31 controls the position of the throttle valve 5 on the basis of a restriction torque B calculated by the restriction torque calculation unit 35 when a prescribed drive condition indicating occurrence of an external request is satisfied, and controls the position of the exhaust bypass valve 22 on the basis of a corrected torque C calculated by the corrected torque calculation unit 36.

When an ordinary drive is done according to a driver request, target air charging efficiency is determined on the basis of a driver request torque A, a position of the throttle valve 5 is determined on the basis of the target air charging efficiency, a necessary amount of fuel is injected with proper timing, and proper ignition timing is set. At the same time, a necessary supercharging pressure for intake air is set by controlling the turbocharger 10 and the exhaust bypass valve 22. For example, in a full-throttle state (the throttle valve 5 is full open) in which large acceleration is requested, the exhaust bypass valve 22 is closed completely.

The engine control unit 31 sets first target air charging efficiency X for a driver request torque A. For an external request, the engine control unit 31 sets, with priority over a driver request torque A, a restriction torque B that is a request torque based on the external request. In particular, the engine control unit 31 sets a corrected torque C that is different from the restriction torque B only to control the exhaust bypass valve 22. And the engine control unit 31 sets second target air charging efficiency Y on the basis of the restriction torque B and sets third target air charging efficiency Z on the basis of the corrected torque C.

Since the restriction torque B has a smaller value than the driver request torque A, the second target air charging efficiency Y is set so as to have a smaller value than the first target air charging efficiency X. Since the corrected torque C has a larger value than the restriction torque B, the third target air charging efficiency Z is set so as to have a larger value than the second target air charging efficiency Y. If the corrected torque C is set equal to the driver request torque A, the third target air charging efficiency Z becomes equal to the first target air charging efficiency X. If the corrected torque C is set smaller than the driver request torque A, the third target air charging efficiency Z becomes lower than the first target air charging efficiency X. On the other hand, if the corrected torque C is set greater than the driver request torque A, the third target air charging efficiency Z becomes higher than the first target air charging efficiency X.

The vehicle F is equipped with a stepless transmission mechanism 40 capable of varying the transmission gear ratio continuously. Having a stepless automatic transmission mode for varying the transmission gear ratio steplessly in a state that the shift lever that is manipulated by the driver is at the automatic shift position, the stepless transmission mechanism 40 is controlled automatically on the basis of one of various input signals originating from the driver or according to a drive state. The stepless transmission mechanism 40 is controlled by a transmission control unit 32 of the electronic control unit 30.

The stepless transmission mechanism 40 is disposed at a halfway position in a power transmission path between the engine E and drive wheels W, and has a function of transmitting drive power (rotational power) of the engine E to the drive wheels W with a proper transmission gear ratio that is suitable for a drive situation. The embodiment employs, as the stepless transmission mechanism 40, a continuously variable transmission (CVT) capable of varying the transmission gear ratio continuously using a power transmission member other than gears, such as a belt or a chain. Thus, the stepless transmission mechanism 40 enables stepless (i.e., continuous) setting of a transmission gear ratio.

An example of the above-mentioned temporary torque reduction request (i.e., external request) is one that is associated with a step-up shift control for decreasing the engine rotation speed discontinuously by decreasing the transmission gear ratio of the stepless transmission mechanism 40 automatically (i.e., not on the basis of a driver request) during acceleration with a driver request torque A.

Figure 3A:
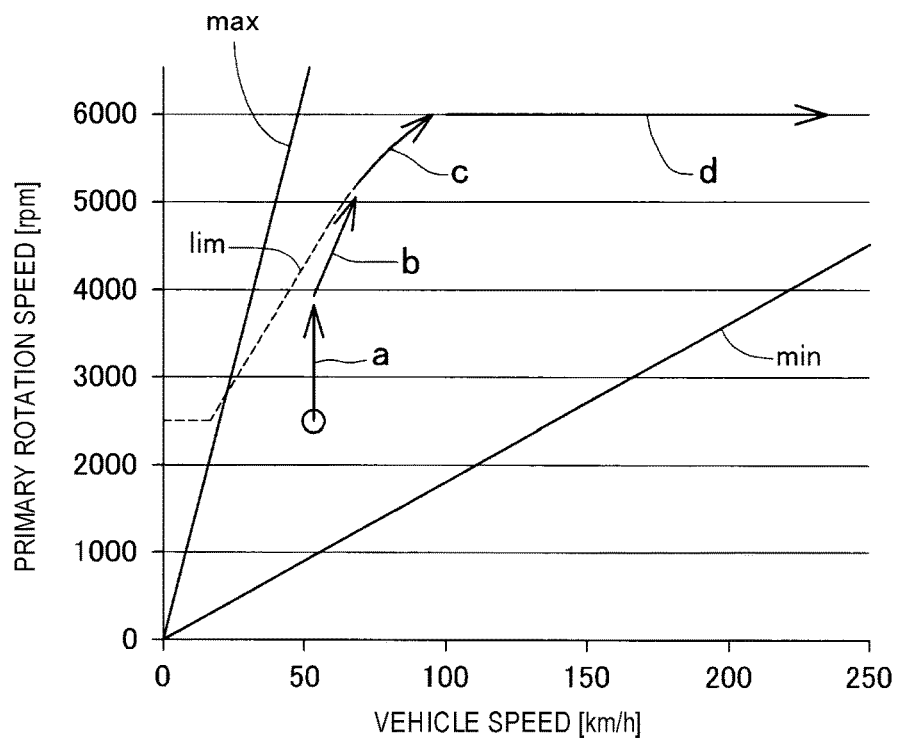
FIGS. 3A and 3B are graphs illustrating a shift-up control.

The step-up shift control will be described below. In an ordinary acceleration control based on a driver request, for example, as shown in FIG. 3A, the opening/closure of the throttle valve 5 is controlled to a position corresponding to a degree of stepping on the accelerator and the exhaust bypass valve 22 is operated in the closing direction according to the degree of acceleration, whereby the supercharging pressure is raised. The engine rotation speed (primary rotation speed) increases as the vehicle speed increases (indicated by arrows a, b, and c in FIG. 3A). However, there exists, above a certain speed (in FIG. 3A, about 100 km/h), a decoupled drive range where as indicated by arrow d the engine rotation speed is not increased but is kept constant (in FIG. 3A, 6,000 rpm) even if the vehicle speed increases.

In FIG. 3A, symbol max denotes a line of maximum engine rotation speeds for vehicle speeds, symbol min denotes a line of minimum engine rotation speeds for vehicle speeds, and symbol lim denotes a limit time of upper limit engine rotation speeds for vehicle speeds in the case of an ordinary acceleration control. During acceleration, the transmission gear ratio is controlled along the limit line lim.

Figure 3B:
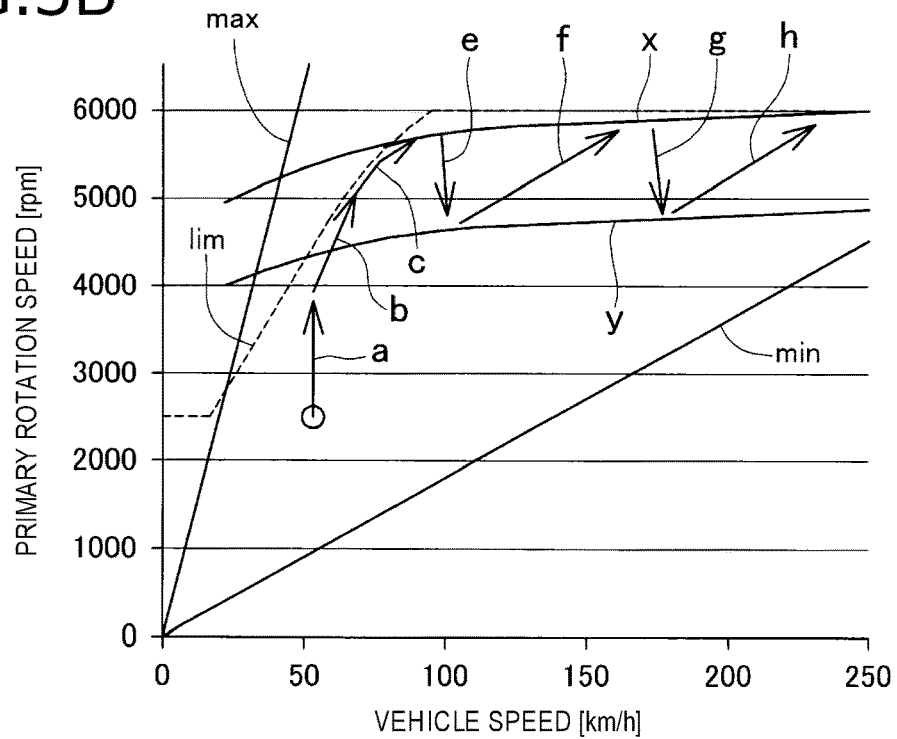

In the case of a step-up shift control, for example, as shown in FIG. 3B, the engine rotation speed increases as the vehicle speed increases (indicated by arrows a, b, and c in FIG. 3A) and the above-mentioned decoupled drive range is reached. From this time onward, controls of decreasing the transmission gear ratio stepwise are performed repeatedly between a control upper limit line x and a control lower limit line y (step-up shifting). In first step-up shifting, the transmission gear ratio is decreased discontinuously and the engine rotation speed decreases steeply as indicated by arrow e, whereby the control lower limit line y is reached. Then the engine rotation speed increases gradually with acceleration as indicated by arrow f, whereby the control upper limit line x is reached again. Next, in second step-up shifting, the transmission gear ratio is decreased discontinuously and the engine rotation speed decreases steeply as indicated by arrow g, whereby the control lower limit line y is reached. Then the engine rotation speed increases gradually with acceleration as indicated by arrow h, whereby the control upper limit line x is reached again. The next step-up shifting is started.

A period when a control for decreasing the transmission gear ratio is performed in the above-described manner as a step-up shift control will be hereinafter referred to as a "step-up shift period."

To prevent the driver from experiencing a drive feeling that the vehicle F were being pushed forward when the inertia variation in, for example, a step-up shift period is large, the comparison technique deals with a temporary torque reduction request by lowering the supercharging pressure through opening of the exhaust bypass valve 22 by setting, in response to an automatic request from the transmission control unit 32, the target torque smaller than a torque corresponding to target air charging efficiency that is lower than target air charging efficiency corresponding to a driver request torque A. This results in a problem that the intake air pressure does not rise immediately after the end of the step-up shift period (supercharging delay).

Figure 4:
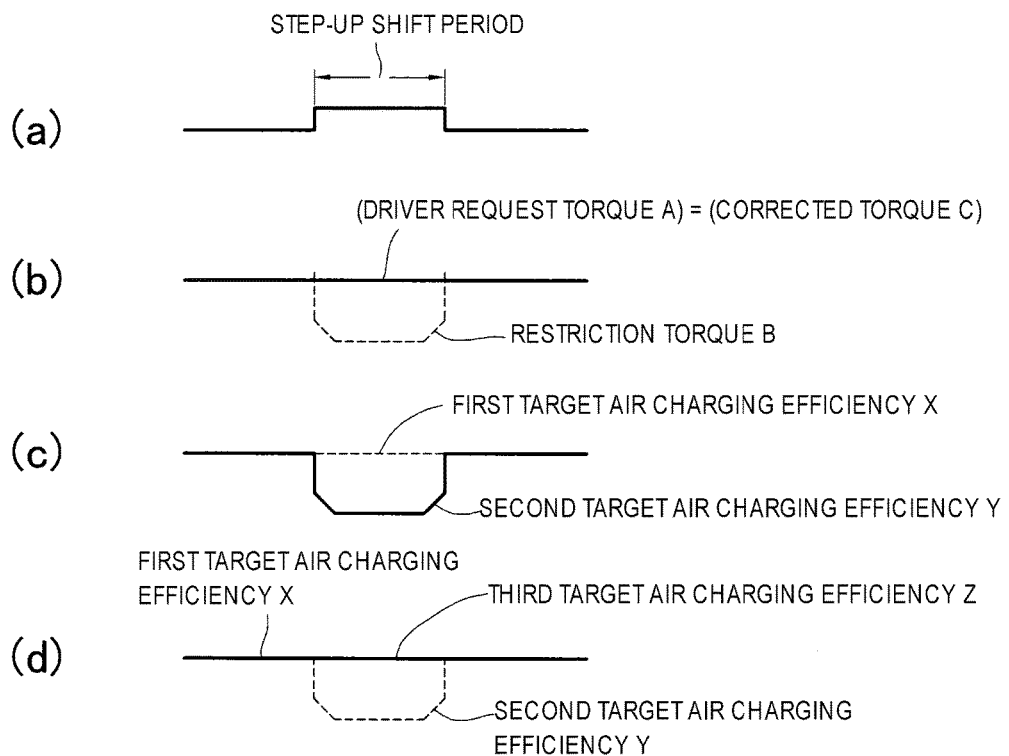
FIG. 4 is a graph illustrating a control that is performed in the embodiment in a step-up shift period.

In contrast, in the embodiment, during a step-up shift period (see (a) of FIG. 4), a restriction torque B that is smaller than a driver request torque A is set as shown in (b) of FIG. 4. The restriction torque B is employed with priority over the driver request torque A. As shown in (c) of FIG. 4, target air charging efficiency that is set so as to correspond to the driver request torque A is first target air charging efficiency X. And target air charging efficiency that is set so as to correspond to the restriction torque B is second target air charging efficiency Y. The second target air charging efficiency Y is employed during the step-up shift period.

However, as shown in (d) of FIG. 4, only for the purpose of controlling the turbocharger 10 and the exhaust bypass valve 22, the engine control unit 31 sets a third target air charging efficiency Z separately from the second target air charging efficiency Y corresponding to the restriction torque B that is employed preferentially.

That is, in a drive state without an external request, the first target air charging efficiency X corresponding to the driver request torque A is used for controlling the throttle valve 5, the ignition devices 8, the fuel injection devices, the turbocharger 10, and the exhaust bypass valve 22.

In a drive state with an external request, whereas the second target air charging efficiency Y corresponding to the restriction torque B is used for controlling the throttle valve 5, the ignition devices 8, and the fuel injection devices, the third target air charging efficiency Z that is higher than the second target air charging efficiency Y is used for controlling only the turbocharger 10 and the exhaust bypass valve 22.

It suffices that in the period concerned the third target air charging efficiency Z be higher than the second target air charging efficiency Y for the external request being employed preferentially; for example, as shown in (d) of FIG. 4, the third target air charging efficiency Z may be the same as the first target air charging efficiency X corresponding to the driver request torque A before the step-up shift period. As a result, the exhaust bypass valve 22 is not opened or, even if it is opened, the degree of opening is lower than in the conventional case. As a result, in the step-up shift period, reduction of the intake air pressure can be suppressed. This makes it possible to suppress the supercharging delay when the torque rises after the reduction caused by the temporary toque reduction request.

If the above-described control of the exhaust bypass valve 22 using the third target air charging efficiency Z is maintained, due to an excessive torque, the driver would experience a drive feeling that the vehicle F were being pushed forward. To solve this problem, in the step-up shift period (see (c) of FIG. 5), the engine control unit 31 performs a control for lowering the fuel combustion performance in the combustion chambers 2 (see (f) of FIG. 5), whereby the generated torque is weakened (see (d) of FIG. 5).

Figure 5:
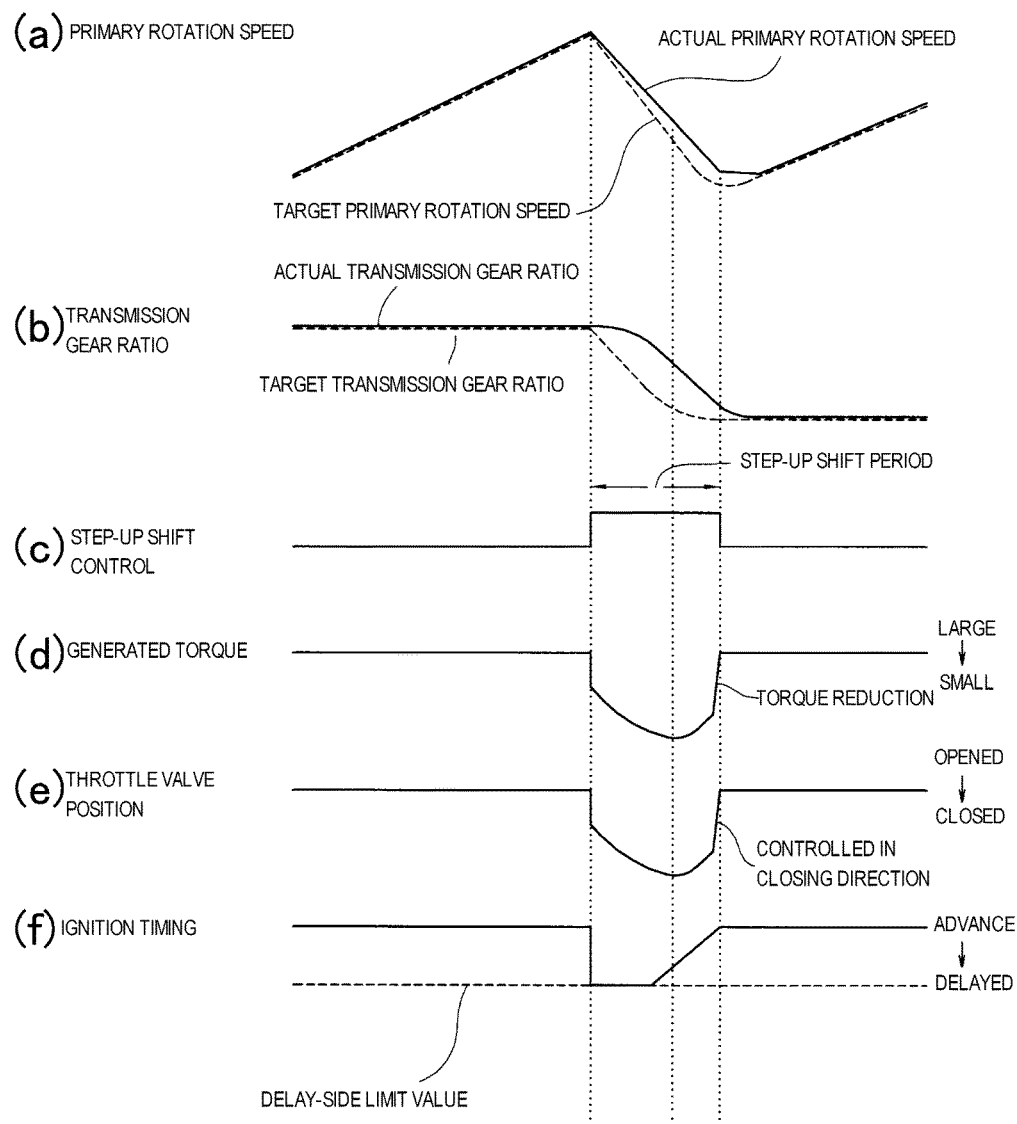
FIG. 5 is a graph illustrating a further control that is performed in the embodiment in the step-up shift period.

Although in (f) of FIG. 5 the control for lowering the fuel combustion performance in the combustion chambers 2 is delaying the ignition timing of the ignition devices 8, another control of, for example, decreasing the fuel injection amount may be performed in place of or in addition to the control shown in (f) of FIG. 5.

If the control for lowering the fuel combustion performance is insufficient to attain a necessary reduction of the generated torque, a control of changing the position of the throttle valve 5 in the closing direction may be performed additionally (see (e) of FIG. 5) as another control for weakening the generated torque.

Figure 6:
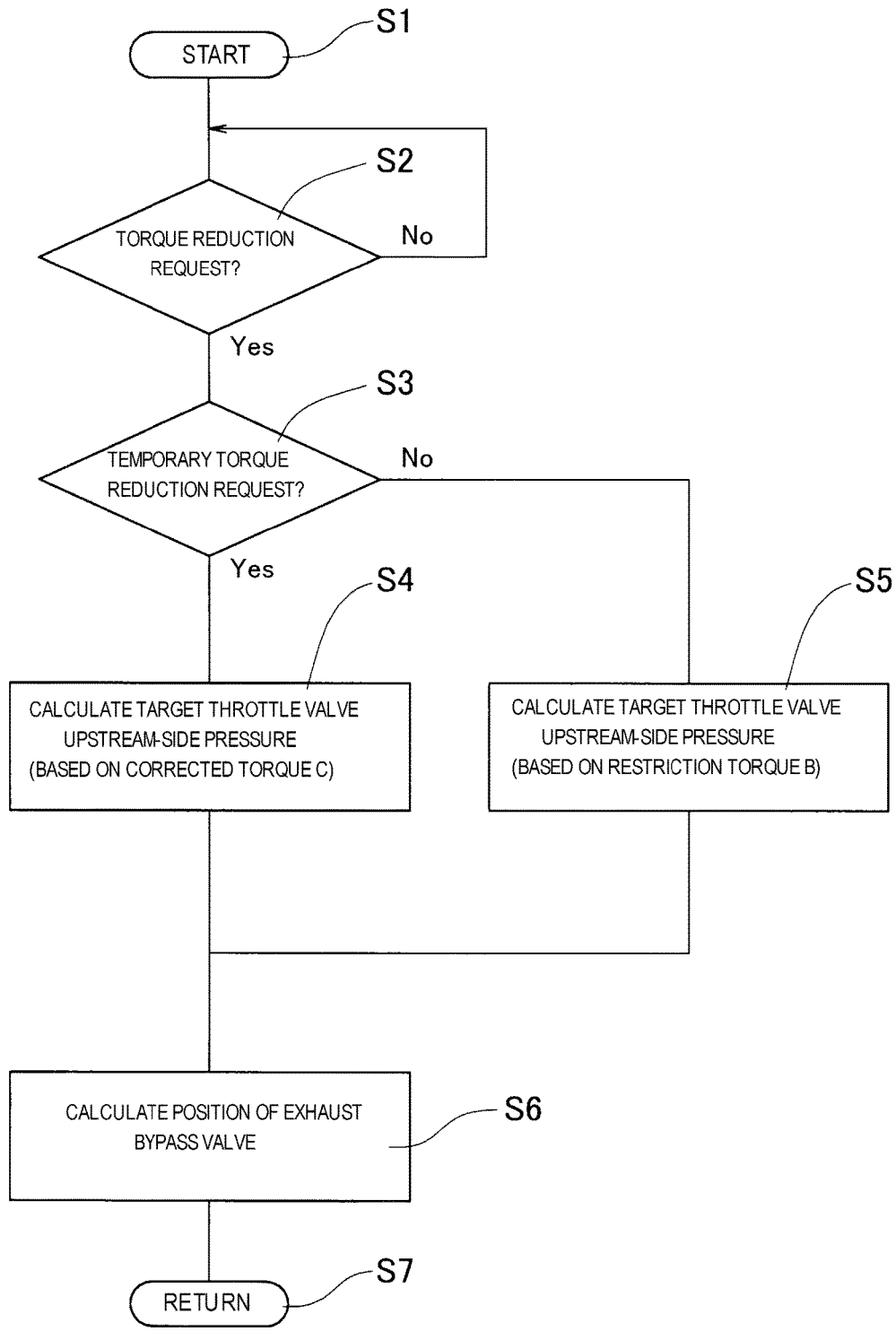
FIG. 6 is a flowchart of a process for determining a position of an exhaust bypass valve in the embodiment.

FIG. 6 is a flowchart of a process for determining a position of the exhaust bypass valve 22. In this process, a control is started at step S1. At step S2, it is judged whether a torque reduction request has been received. If a torque reduction request has been received (S2: yes), the process moves to step S3, where it is judged whether the torque reduction request is an external request, that is, an external, temporary torque reduction request that is not a driver request.

If the torque reduction request is an external, temporary torque reduction request that is not a driver request (S3: yes), the process moves to step S4, where a target pressure throttle valve upstream-side pressure (target air charging efficiency) is calculated to determine a position of the exhaust bypass valve 22. In doing so, third target air charging efficiency Z corresponding to a corrected torque C is employed as target air charging efficiency. The third target air charging efficiency Z is the same as first target air charging efficiency X corresponding to a driver request torque A. These calculation and determination can be performed by a position determining unit 33 of the electronic control unit 30 (this also applies to the following steps).

At step S6, the opening/closure of the exhaust bypass valve 22 is controlled on the basis of the third target air charging efficiency Z that was employed at step S4. At this time, the throttle valve 5, the ignition devices 8, the fuel injection devices, etc. excluding the exhaust bypass valve 22 are controlled using a second target air charging efficiency Y that is determined on the basis of a restriction torque B.

If the torque reduction request is not a temporary one but one to last for a prescribed time or more (S3: no), the process moves to step S5, where a target pressure throttle valve upstream-side pressure (target air charging efficiency) is calculated to determine a position of the exhaust bypass valve 22. In doing so, since the torque reduction request is not a temporary one, target air charging efficiency (second target air charging efficiency Y) for the torque reduction request itself (corresponding to a restriction torque B) is used as it is for control of the exhaust bypass valve 22. At this time, the throttle valve 5, the ignition devices 8, the fuel injection devices, etc. excluding the exhaust bypass valve 22 are controlled using the same target air charging efficiency.

If the torque reduction request is not an external request but a driver request, target air charging efficiency (target air charging efficiency X) for that torque reduction request (corresponding to a driver request torque A) is used as it is for control of the exhaust bypass valve 22. At this time, the throttle valve 5, the ignition devices 8, the fuel injection devices, etc. excluding the exhaust bypass valve 22 are controlled using the same target air charging efficiency.

At step S6, the opening/closure of the exhaust bypass valve 22 is controlled on the basis of the target air charging efficiency that was employed at step S5. At this time, the throttle valve 5, the ignition devices 8, the fuel injection devices, etc. excluding the exhaust bypass valve 22 are controlled also using the target air charging efficiency that was employed at step S5. After step S7, the same steps as described above are repeatedly executed.

In the embodiment, since the exhaust bypass device 20 is of the electric control type, it can be driven even in the case of a low supercharging pressure and can be controlled more finely. However, the exhaust bypass device 20 may be controlled by a pneumatic actuator.

Example temporary torque reduction requests (each of which is not a driver request) other than one associated with a step-up shift control (described in the embodiment) are ones that are associated with torque reducing functions for, for example, preventing the vehicle F from suffering danger such as a side slip preventive function and an acceleration shock (a feeling of pushing-forward or a rush of the vehicle body) reducing function.

Although the embodiment is directed to the case that the engine E is a 4-cycle gasoline engine, the invention is not limited to that case; the invention can also be applied to other cases of using any other type of gasoline engine, a diesel engine, or the like.

What is claimed is:

1. A control device for a vehicle provided with an internal combustion engine that has an intake passage and an exhaust passage which are connected to a combustion chamber, a throttle valve disposed in the intake passage, a turbocharger having an exhaust gas turbine which is disposed in the exhaust passage and driven by an exhaust gas flowing through the exhaust passage and a compressor which is disposed in the intake passage and supercharges intake air to be supplied to the combustion chamber, and an exhaust bypass valve for opening or closing an exhaust bypass passage that connects portions, upstream of and downstream of the exhaust gas turbine, of the exhaust passage, the control device comprising:
   a controller and a storage that stores a program that causes the controller to:
      determine whether a prescribed drive condition is satisfied;
      detect a driver request torque which is an engine output torque requested by a driver;
      calculate a restriction torque which is smaller than the driver request torque based on an external request;
      calculate a corrected torque which is greater than the restriction torque independently from the driver request torque; and
      control a position of the throttle valve and a position of the exhaust bypass valve in accordance with one of an ordinary drive based on the detected driver request torque and a driving condition based on the external request, wherein
   in the ordinary drive, the control step controls the position of the throttle valve and the position of the exhaust bypass valve based on the detected driver request torque,
   determine whether a torque reduction request of the external request is temporary or not,
   when the torque reduction request of the external request is temporary, the control step controls the position of the throttle valve based on the calculated restricted torque and controls the exhaust bypass valve based on the calculated corrected torque, and
   when the torque reduction request of the external request is not temporary, the control step controls the position of the throttle valve and the position of the exhaust bypass valve based on the restricted torque.

2. The control device according to claim 1, wherein the corrected torque based on the external request is the same as the driver request torque based on the ordinary drive.

3. The control device according to claim 1, wherein the vehicle has a stepless transmission mechanism for varying a transmission gear ratio steplessly,
   the control device further comprising:
   a transmission control unit that controls the stepless transmission mechanism,
   wherein the prescribed drive condition relates to a step-up shift control of decreasing the transmission gear ratio of the stepless transmission mechanism and thereby lowering the engine rotation speed during acceleration.

4. The control device according to claim 1, wherein in controlling the position of the exhaust bypass valve based on the corrected torque, the control step controls lowering a fuel combustion performance in the combustion chamber.

5. The control device according to claim 4, wherein the internal combustion engine has an ignition device for burning fuel in the combustion chamber; and
   wherein the control step delays an ignition timing of the ignition device for lowering the fuel combustion performance in the combustion chamber.

6. The control device according to claim 4, wherein the control step controls the position of the throttle value in a closing direction in controlling the position of the exhaust bypass valve based on the corrected torque.

7. The control device according to claim 4, further comprising:
   a fuel injector injecting fuel to one of the intake passage and the combustion chamber,
   wherein the control step reduces an amount of fuel injected by the fuel injector.

8. The control device according to claim 1, wherein
when the torque reduction request is temporary, the torque reduction request includes at least one of,
- a first external request in a step-up shift control of a transmission in which an engine rotation speed reduces during acceleration of the vehicle,
- a second external request in a side slip preventative control that prevents the vehicle from a side slip, and
- a third external request in an acceleration shock reducing control for reducing an acceleration shock that pushes the vehicle forward or rushes the vehicle.

9. The control device according to claim 8, wherein
when the torque reduction request is not temporary, the torque reduction request includes a request other than the first external request, the second external request, and the third external request.

* * * * *